United States Patent
Grimsrud et al.

(10) Patent No.: US 11,054,993 B2
(45) Date of Patent: Jul. 6, 2021

(54) MASS STORAGE SYSTEM HAVING PEER-TO-PEER DATA MOVEMENTS BETWEEN A CACHE AND A BACKEND STORE

(71) Applicant: Intel Corporation, Santa Clara, CA (US)

(72) Inventors: Knut S. Grimsrud, Forest Grove, OR (US); Sanjeev N. Trika, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/424,329

(22) Filed: May 28, 2019

(65) Prior Publication Data

US 2019/0310776 A1    Oct. 10, 2019

(51) Int. Cl.
| | |
|---|---|
| *G06F 3/06* | (2006.01) |
| *G06F 12/0862* | (2016.01) |
| *G06F 12/0868* | (2016.01) |
| *G06F 12/0891* | (2016.01) |

(52) U.S. Cl.
CPC ............ *G06F 3/0611* (2013.01); *G06F 3/067* (2013.01); *G06F 3/0646* (2013.01); *G06F 3/0685* (2013.01); *G06F 12/0862* (2013.01); *G06F 12/0868* (2013.01); *G06F 12/0891* (2013.01)

(58) Field of Classification Search
CPC .................................................... G06F 3/0611
USPC ........................................................ 711/111
See application file for complete search history.

(56) References Cited

U.S. PATENT DOCUMENTS

| | | | |
|---|---|---|---|
| 2009/0144347 A1 | 6/2009 | Boyd et al. | |
| 2013/0297853 A1* | 11/2013 | Balakrishnan | G06F 12/0866 711/103 |
| 2016/0092361 A1 | 3/2016 | Grimsrud et al. | |
| 2016/0094619 A1 | 3/2016 | Khan et al. | |
| 2016/0162205 A1 | 6/2016 | Grimsrud | |
| 2016/0259568 A1 | 9/2016 | Grimsrud et al. | |
| 2017/0024275 A1 | 1/2017 | Grimsrud et al. | |
| 2018/0089088 A1 | 3/2018 | Jakowski et al. | |
| 2019/0087374 A1 | 3/2019 | Khan et al. | |

OTHER PUBLICATIONS

Evans, Chris, Architecting IT, "Cache or Tier—Does it Matter?", https://www.architecting.it/blog/cache-or-tier-does-it-matter/, Oct. 11, 2016.
Frazee, Paul, "Why P2P Deserves Another Chance", https://pfrazee.github.io/blog/why-p2p-deserves-another-chance, Oct. 1, 2018.

* cited by examiner

*Primary Examiner* — Jae U Yu
(74) *Attorney, Agent, or Firm* — Compass IP Law PC

(57) ABSTRACT

An apparatus is described. The apparatus includes peer-to-peer intelligence to be integrated into a mass storage system having a cache and a backing store. The peer-to-peer intelligence is to move data between the cache and backing store without the data passing through main memory.

20 Claims, 12 Drawing Sheets

MASS STORAGE SYSTEM HAVING PEER-TO-PEER DATA MOVEMENTS BETWEEN A CACHE AND A BACKEND STORE

FIELD OF INVENTION

The field of invention pertains generally to a mass storage system having peer-to-peer data movements between storage devices.

BACKGROUND

Computing system designers are continuously seeking ways to improve the performance of their systems. With the onset of "big data", "cloud computing" and other data center centric computing paradigms, the importance of accessing increasing sizes of data with increasing performance is driving additional layers in the storage hierarchy, such as high-speed storage being used to cache slower speed storage.

FIGURES

A better understanding of the present invention can be obtained from the following detailed description in conjunction with the following drawings, in which.

DETAILED DESCRIPTION

Figure 1:
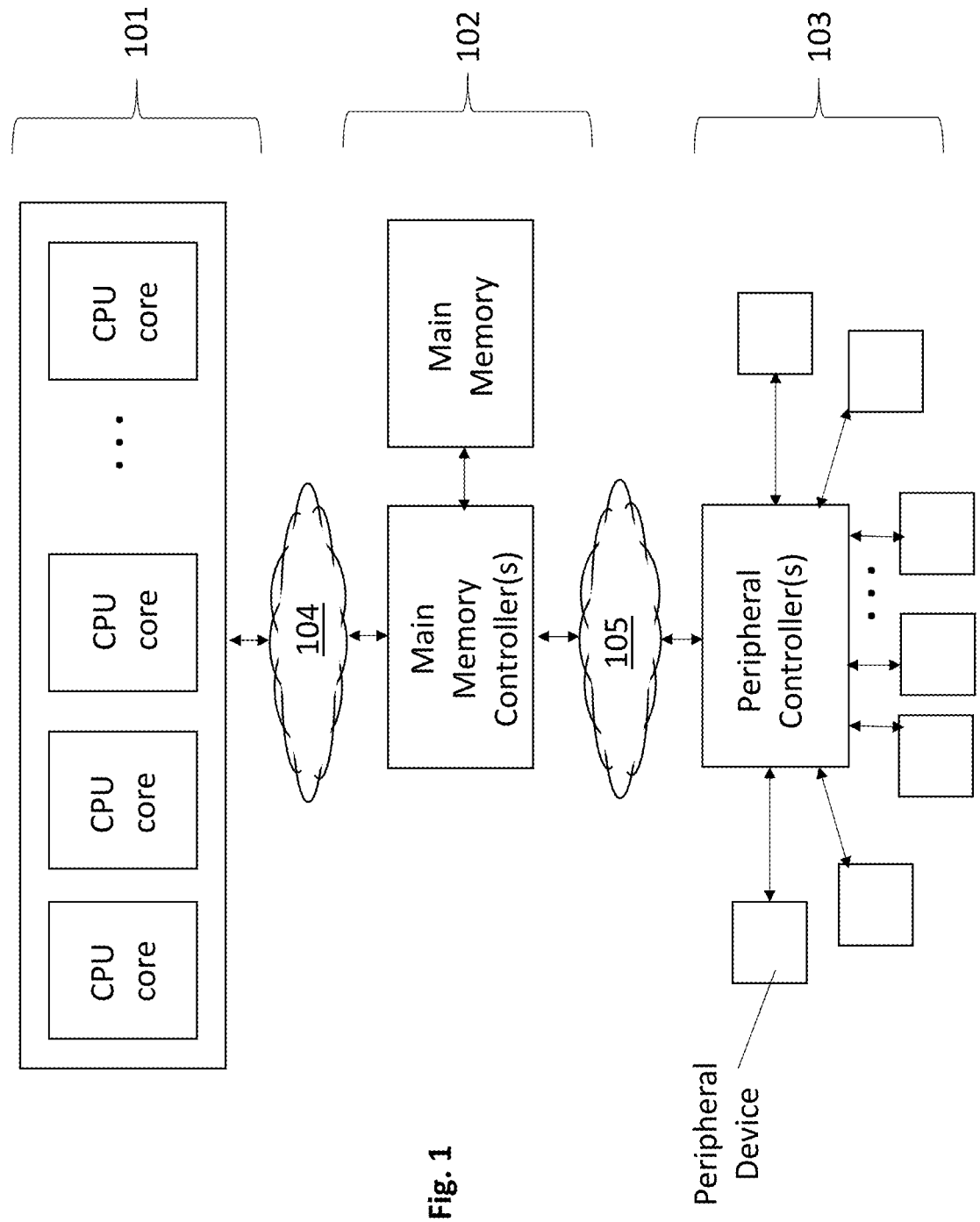
FIG. 1 shows a model of a computing system.

FIG. 1 depicts a basic model 100 of a computing system. As observed in FIG. 1, a computing system can be thought of as having three major layers of functionality. A first, central processing unit (CPU) layer 101 includes one or more processors each having one or more instruction execution pipelines. A second, main memory layer 102 includes the main memory (or "system memory") and the main memory control function (e.g., one or more main memory controllers). The main memory layer 102 is connected to the CPU layer 101 by a network or interconnect of some kind 104 so that instructions to be executed by the CPU layer 101 and data to be operated on by the execution of these instructions can be called up from main memory 102. Likewise, new data that is generated by the execution of the instructions can be written back to main memory.

Beneath the main memory layer 102 is the peripheral layer 103. The peripheral layer 103 generally includes peripheral components/devices that, e.g., "plug-in" to the computer such as network interface adaptors and mass storage devices. A peripheral controller is commonly used to coordinate communications between the computer and more than one peripheral device. In the case of mass storage devices, traditionally, the mass storage devices are composed of a slower, non volatile storage technology (e.g., a hard disk drive), whereas, main memory is composed of faster, volatile memory technology (e.g., dynamic random access memory (DRAM)). The peripheral layer 103 is connected to the main memory 102 layer by a network or interconnect of some kind 105.

Runtime execution of the computer continuously entails needed data being called up (read) from mass storage and then written into main memory (e.g., when a software application is launched (among other possible causes)), and, updated data being read from main memory and then written into mass storage (e.g., when a software application is closed (among other possible causes)).

In order to improve the latency of these transactions, many modern day computing systems include a tiered storage in the peripheral layer. Here, a higher tier (e.g., tier 1) of overall mass storage is implemented with a faster mass storage technology (e.g., a solid state drive (SSD)) and a lower tier (e.g., tier 2) is implemented with a slower, less expensive mass storage technology (e.g., a disk drive).

In the case of "disk caching" higher tier storage is used as a cache for lower tier storage (which behaves as the final, "backing" store of the system). Disk caching has become particularly important with the onset of "big data", "cloud computing" and other data center related implementations because the traditional "slowness" of mass storage is becoming more and more of a system bottleneck.

As such, new emerging non volatile random access memory (NVRAM) technologies are being developed having read and/or write latencies that are comparable with that of DRAM. Such emerging memories are therefore generally faster than both disk drives and flash memory. Many of these emerging non volatile random access memories are composed of resistive storage cells that are formed in three-dimensional storage arrays above a semiconductor chip substrate (e.g., amongst the chip's interconnect wiring levels).

For example, the storage cells are "stacked" upon one another above the substrate but are separately addressable (e.g., by way of a "crosspoint" access architecture where a first set of access lines run orthogonal to a second set of access lines and a particular, accessed cell resides at the intersection of a pair of activated access lines). A higher resistive cell state corresponds to one logical state and a lower resistive cell state corresponds to a second logical state. An example of an emerging NVRAM technology is Optane™ or 3D XPoint™ memory from Intel Corporation, or, QuantX™ from Micron Corporation. More generally, emerging NVRAM technologies may be composed of phase change memory, dielectric memory, ferroelectric memory, magnetic memory, spin transfer torque memory, among other possible technologies.

Thus, the non volatile mass storage of present-day leading edge systems can include emerging NVRAM devices at tier 1 that act as a cache (loosely referred to as a "disk cache") for a tier 2 backing store composed of SSDs and/or disk drives. Even though the emergence of NVRAM as a disk cache can improve the raw performance of the mass storage implementation at the peripheral level 103, overall system performance is not dramatically improved because of inefficiencies associated with the caching read/write algorithms which, unfortunately, include the involvement of main memory.

Figure 2A:
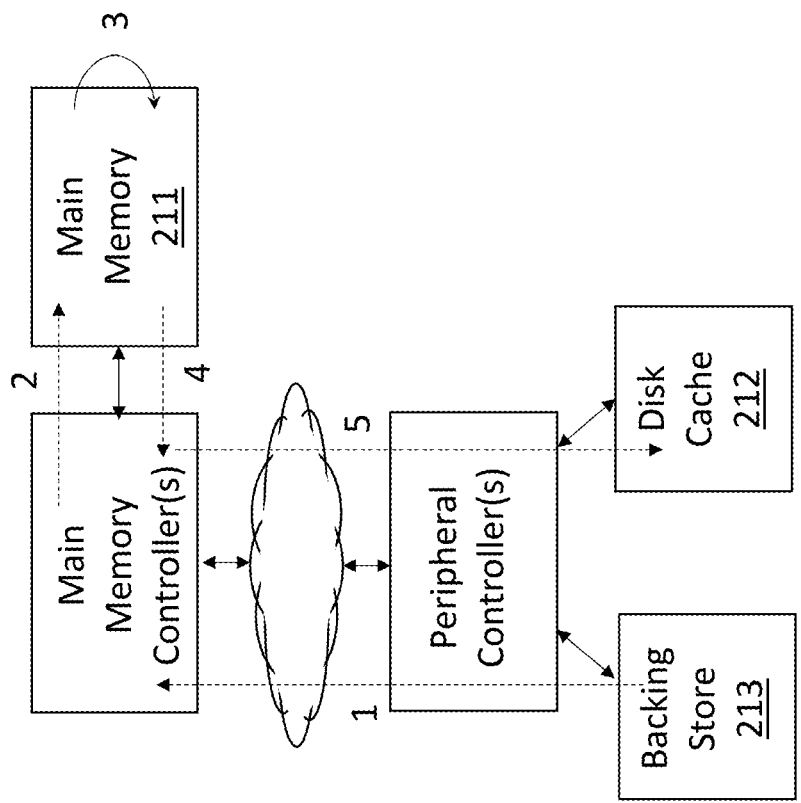
FIGS. 2a, 2b, 2c and 2d show traditional disk cache data movements.

FIGS. 2a, 2b, 2c and 2d show four standard disk cache data movement algorithms where main memory is included in the data movement. FIG. 2a shows the data movements when needed information is not in main memory 211 nor the disk cache 212. In this case, the data is read 1 from the backing store 213 and written 2 into main memory 211 at a memory location that is allocated to the software application that has requested the data (which completes the call for data from the application's perspective). A background caching process, typically executed by disk cache controller software, copies the data 3 in main memory, reads the data copy from main memory 4 and then writes 5 it back to the disk cache 212 (e.g., in the case of a read allocate cache, so that future accesses of the data from storage will transpire in less time than if it were accessed from the backing store 213).

Figure 2B:
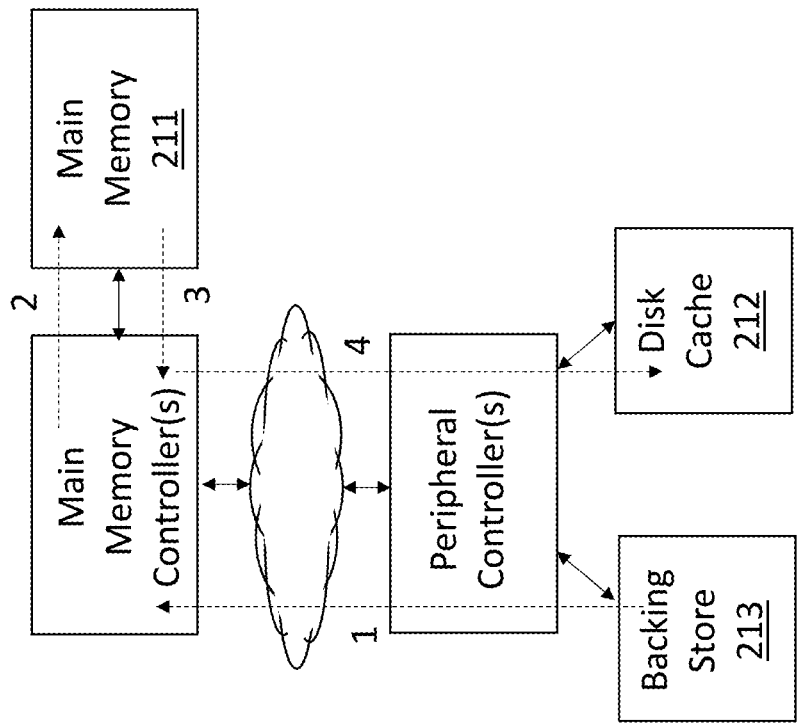

FIG. 2b shows a background pre-fetch caching process. Here, the aforementioned disk cache controller may predict that certain data that is currently stored in the backing store 213 but not in the disk cache 212 will be needed soon, e.g., by one or more applications. The controller therefore causes the data to be read 1 from the backing store 213 and written 2 into main memory 211. The data is then read from main memory 3 and written to the disk cache 4. The data in the main memory 211 is free to be written over with different data after the operation is complete. That is, no application has specifically requested the data yet (no formal call for it to be formally entered in main memory has occurred). Rather, the disk cache controller has predicted that the data will be needed soon and has copied into disk cache 212 in advance of expected requests for the data.

Figure 2C:
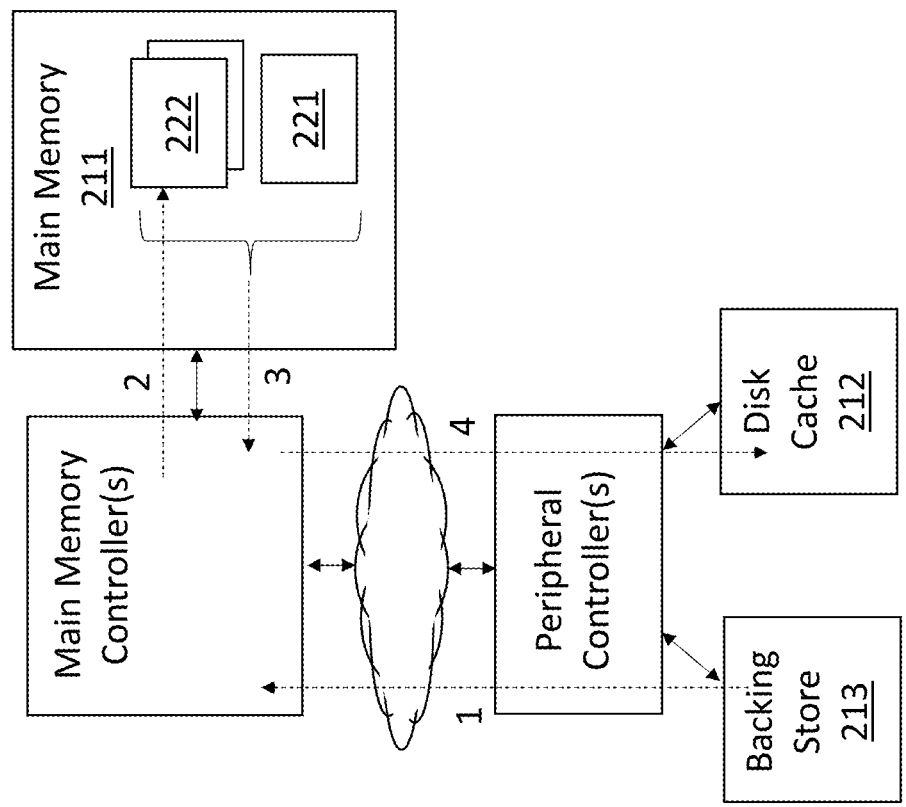

FIG. 2c shows the traditional update of a disk cache 212 in workload environments where disk cache access granularity is larger than backing store access granularity. Here, as is known in the art, for example, data can be read from the backing store 213 as one or more sectors of information and multiple sectors constitute a single "disk cacheline" in the disk cache 212.

If the disk cache controller decides that a sector 221 that is presently in main memory 211 is to be cached in the disk cache 212 and an application has newly written to the sector 221, the disk cache controller will read neighboring sectors from the backing store 213 to form a complete disk-cacheline in main memory 211 and then write the full disk cacheline into the disk cache 212.

For example, if the application has written to sector 221 in main memory 211, the cache controller will not only write the sector 221 into the disk cache 212 but will also write the neighboring sectors 222 into the disk cache 212. If the neighboring sectors 222 do not reside in main memory 211, the cache controller will call up 1 the neighboring sectors 222 from the backing store 213, store 2 them in main memory 211 and then read 3 both the sector 221 and the neighboring sectors 222 from main memory and write 4 them all into the disk cache 212 as a complete disk cacheline.

Figure 2D:
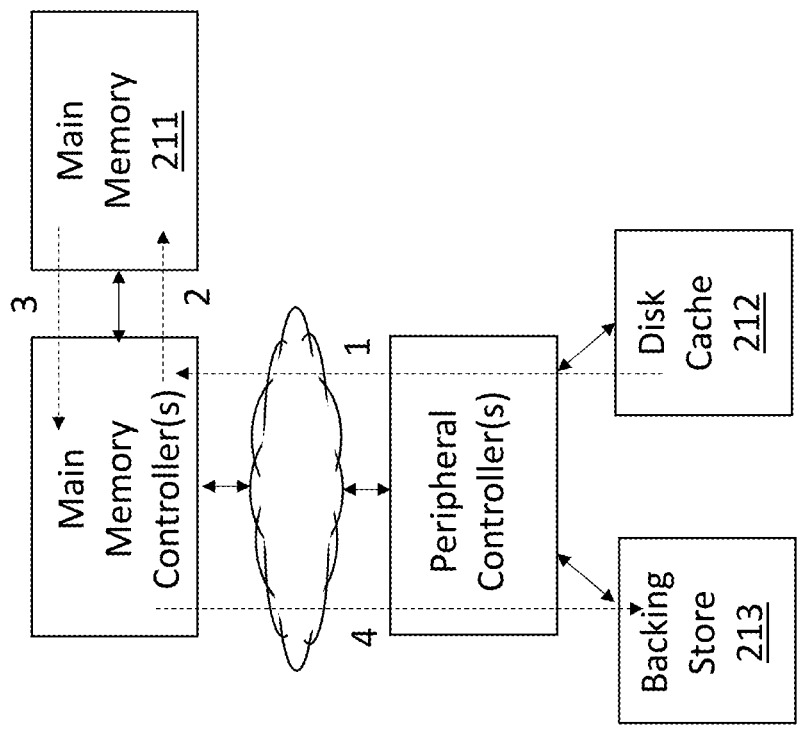

FIG. 2d shows a traditional disk cache eviction process. Here, the disk cache controller may detect that the disk cache is full or near full and decide that it is appropriate to mark certain (e.g., lesser accessed) clean disk cachelines for overwrite and identify certain dirty disk cachelines for eviction from the disk cache 212 to make room in the disk cache 212 for other disk cachelines that the system is using (or are expected to be used soon). In order to evict the dirty disk cachelines from the disk cache 212, the disk cachelines are read 1 from the disk cache 212 and written 2 into main memory 211. The disk cachelines are then read 3 from main memory 211 and written 4 to the backing store 213 (e.g., as a sequence of sectors).

Each of the operations described above with respect to FIGS. 2a through 2d are inefficient from a main memory 211 perspective. That is, they cause unnecessary reads from and/or writes to main memory 211. With the main memory 211 nevertheless being forced to handle these unnecessary operations, overall main memory 211 performance drops from some higher performance level it would otherwise be able to reach if it could replace the unnecessary disk cache related operations with necessary ones.

A solution is to implement the movements of data between the disk cache 212 and the backing store 213 as "peer-to-peer" (P2P) data movements. P2P is an architectural design philosophy, also referred to as "distributed" or "fully distributed", in which multiple computing resources are able to transfer information directly between one another without needing to pass through a central control point.

Thus, in the case of the improved approach described herein, the disk cache and backing store are implemented as separate mass storage instances in a P2P or P2P-like mass storage system. For example, the disk cache may be implemented as one or more SSDs (e.g., composed of emerging NVRAM technology described above), while, the backing store may be implemented as one or more SSDs composed of flash memory and/or or one or more disk drives. As such, by design, the two mass storage resources (the disk cache and the backing store) are able to directly send data to/from one another. That is, the one or more SSDs of the disk cache are able to directly send data to/from the one or more SSDs/disk drives of the backing store. For example, any one SSD of the disk cache can send data to any one SDD or HDD of the backing store and vice versa (all storage devices of the disk cache can transfer data with any/all storage devices of the backing store and vice versa). With the ability to send data to/from one another directly, data that is being moved between these two storage resources need not pass through main memory.

FIGS. 3a, 3b, 3c and 3d show four improved disk cache data movement algorithms where the disk cache has a P2P relationship with the backing store and main memory is (therefore) not involved in the data movement. The improved data movement algorithms of FIGS. 3a through 3d correspondingly relate to the traditional data movement algorithms of FIGS. 2a through 2d (i.e., the data movement algorithm of FIG. 3a corresponds to an improvement over the data movement algorithm of FIG. 2a, the data movement algorithm of FIG. 3b corresponds to an improvement over the data movement algorithm of FIG. 2b, etc.).

Figure 3A:
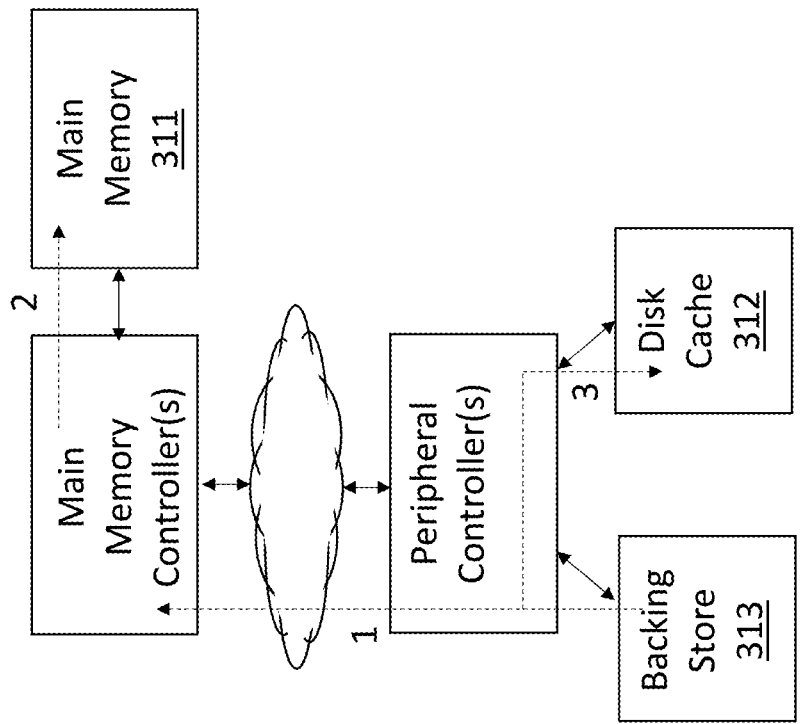
FIGS. 3a, 3b, 3c and 3d show improved disk cache data movements.

FIG. 3a shows the data movements when needed information is not in main memory 311 nor the disk cache 312. In this case, the data is read 1 from the backing store 313 and written 2 into main memory 311 at a memory location that is allocated to the software application that has requested the data (which completes the call for data from the application's perspective). However, rather than make another copy of the data in main memory and writing the copy back to the disk cache (as with the traditional approach of FIG. 2a), instead, the data in the backing store 313 is sent 3 directly to the disk cache 312 as a separate P2P transaction. As such, the system state ends identical to that of FIG. 2a but the wasteful main memory reads and writes associated with the making of the copy and the writeback to disk cache are avoided.

According to one embodiment, the peripheral controller is designed with P2P hardware intelligence that recognizes when data read from the backing store 313 has two destinations (main memory 311 and the disk cache 312) and two separate intra-system flows a call-up from the backing store to main memory, and, a P2P communication from the backing store to the disk cache). In this case, the peripheral controller copies the data read from the backing store 313, sends one version to main memory 311 and sends the other version to disk cache 313. According to a further embodiment, the initial read request sent to the backing store 313 from the main memory controller or CPU core may be specially marked (e.g., by the disk cache controller or other low level software, or special hardware) that the read data from the backing store 313 is to also be sent to the disk cache 313. The peripheral controller snoops this feature in the read request and therefore knows to copy and forwards the read data to the disk cache 312 commensurate with the forwarding of the same read data to main memory 311.

According to another embodiment, the disk cache controller separately informs the backing store 313 that the data is also to be sent to the disk cache 312. The backing store 313 then initiates a separate P2P transaction that sends the data to the disk cache 312.

Figure 3B:
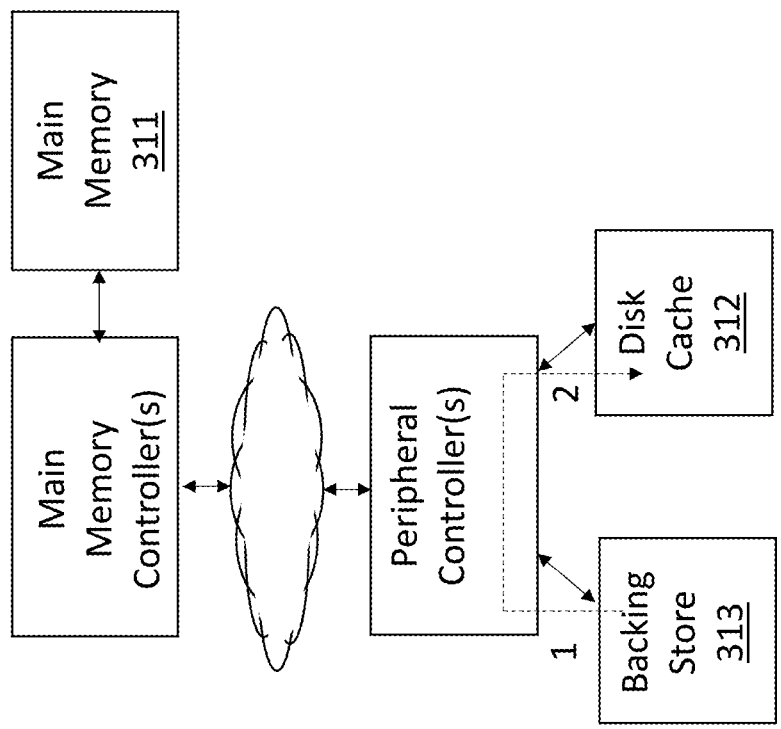

FIG. 3b shows an improved background pre-fetch caching process. Here, again, a disk cache controller may predict that certain data that is currently stored in the backing store 313 but not in the disk cache 312 will be needed soon (e.g., software may call it up into main memory from mass storage, or, the data exists in main memory but software wants to update the data and commit it to mass storage).

The disk cache controller therefore sends a command to the backing store 313 that causes the backing store 313 to read 1 the data and sent it directly 2 to the disk cache 312 as a P2P transaction (rather than having the peripheral controller forward the data to main memory 311 (as in the approach of FIG. 2b)). By avoiding main memory 311 entirely, main memory 311 is made more efficient not only because writes/reads of the data to/from main memory 311 are eliminated, but also, at least in use cases where the data does not already reside in main memory 311, because main memory 311 is not used as a resource to temporarily keep an item of data that no application is presently using. That is, the disk cache controller is predicting that the data will be needed soon but is not, as of yet, actually being used. As such, its presence in main memory (as with the approach of FIG. 2b) is wasteful because precious main memory resources are used to temporarily keep data that is not currently in use.

Figure 3C:
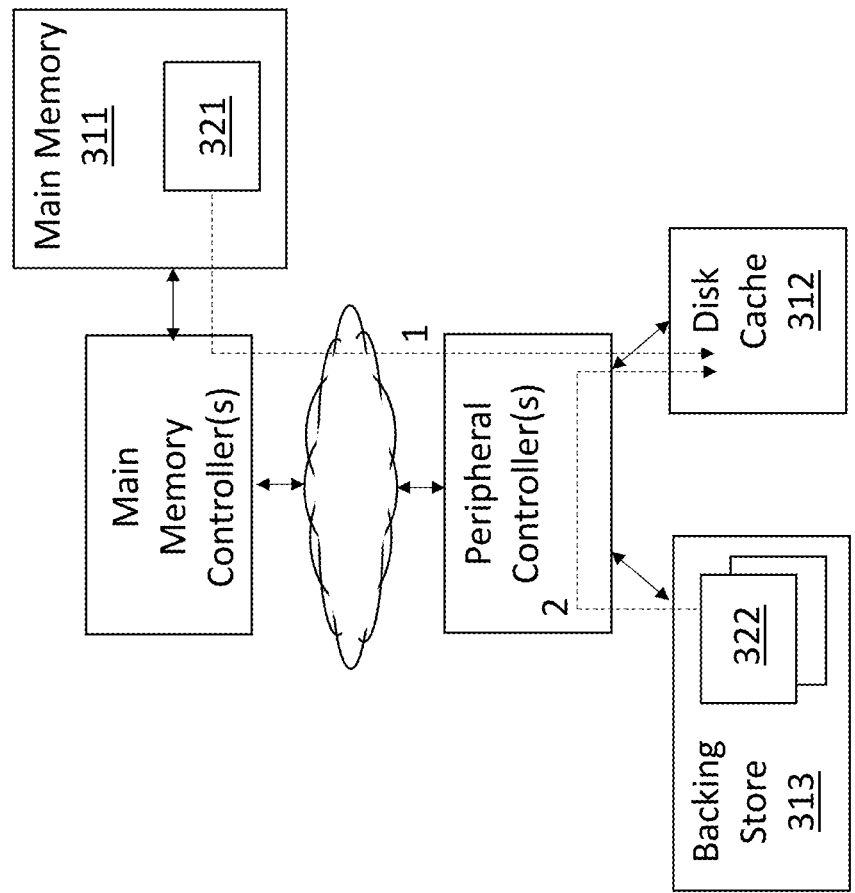

FIG. 3c shows an improved update of a disk cache in workload environments where disk cache access granularity is larger than backing store access granularity. Here, if an application has written to a sector 321 in main memory 311, and the disk cache controller decides that the sector 321 is to be entered into the disk cache 312, the sector 321 is cached 1 in the disk cache 312.

As a separate background process, however, the cache controller sends a command to the backing store 313 that causes the backing store 313 to read the neighboring sectors 322 and send 2 them directly from the backing store 313 to the disk cache 312 as a separate P2P transaction (so that both the sector 321 and the neighboring sectors 322 are resident in the disk cache 312 to form a complete disk cacheline in the disk cache 312). As such, the wasteful writing of the neighboring sectors into main memory and the reading of the neighboring sectors from main memory, as is done in the traditional approach of FIG. 2c, is eliminated.

Figure 3D:
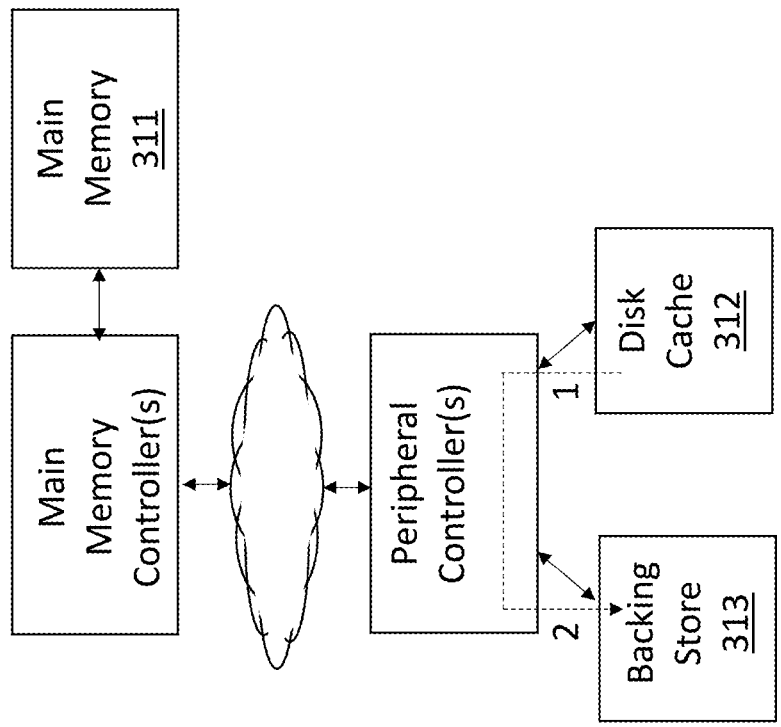

FIG. 3d shows an improved disk cacheline eviction process. Here, the disk cache controller may decide to evict certain (e.g., lesser used) dirty disk cachelines from the disk cache 312 (e.g., to make room in the disk cache 312 for disk cachelines that are newly in use or expected to be in use). In order to evict the dirty disk cachelines from the disk cache, the disk cache controller sends a command to the disk cache 312 that causes the disk cache 312 to read 1 the disk cachelines from the disk cache 312 and send 2 them directly to the backing store 313 as a P2P transaction. As such, the wasteful writing of the disk cachelines to system memory followed by their being read from system memory, as is done in the process of FIG. 2d, is avoided.

Figure 4:
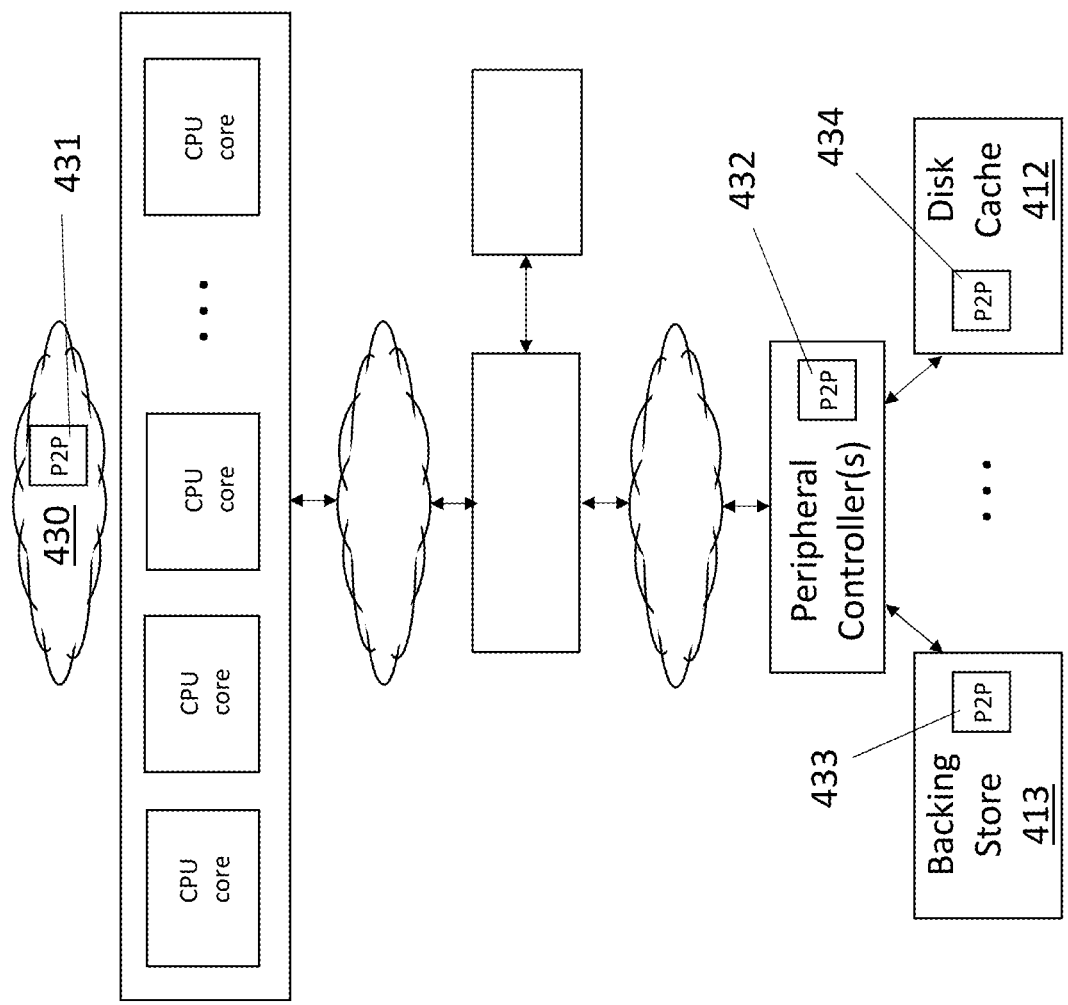
FIG. 4 shows a computing system that can implement any/all of the improved disk cache data movements of FIGS. 3a, 3b, 3c and 3d.

FIG. 4 shows a number of different architectural locations where P2P intelligence may reside to fully or partially control any/all of the improved disk caching related data movements described above with respect to FIGS. 3a through 3d. Here, location 431 corresponds to integration of P2P intelligence in any of the software that executes on the CPU core(s) of the system. For instance, P2P intelligence 431 may be integrated within any/all of disk cache controller software, an operating system, a virtual machine monitor, a device driver for a disk cache storage device, a device driver for a backing storage device, etc.

Likewise, P2P intelligence 432, 433, 434 may be integrated in the hardware and/or firmware associated with any of the peripheral controller(s), a disk cache storage device 412 and/or a backing storage device 413. For any computing system, P2P intelligence to effect any/all of the improved data transfers described above may be located entirely in software 431, entirely in hardware and/or firmware 432, 433 and/or 434, and/or, any combination of software 431 and hardware and/or firmware 432, 433 and/or 434.

In one particular embodiment, P2P intelligence is associated with the disk cache 412 (or the disk cache 412 and the backing store 413) and, moreover, the disk cache 412 presents the overall storage system interface to the host computer system. As such, the host does not send access requests to the backing store 413 directly. Rather, the host sends all storage access requests to the disk cache 412. The disk cache 412 services from the cache those host requests that target pages that are in the disk cache. For those requests that target pages that are not in the disk cache, the disk cache 412 sends the necessary communication to the backing store 413 (e.g., sends read commands to the backing store 413 for read requests that suffer a cache miss, sends write commands to the backing store 413 for the write requests that suffer a cache miss).

In such embodiments, with respect to the read operations from the backing store 413 of FIGS. 3a, 3b, 3c, such read operations may be performed as depicted (where the host receives the read data directly/unilaterally from the backing store 413), or, the read data may flow through the disk cache hardware consistent with its storage interface definition.

Figure 5:
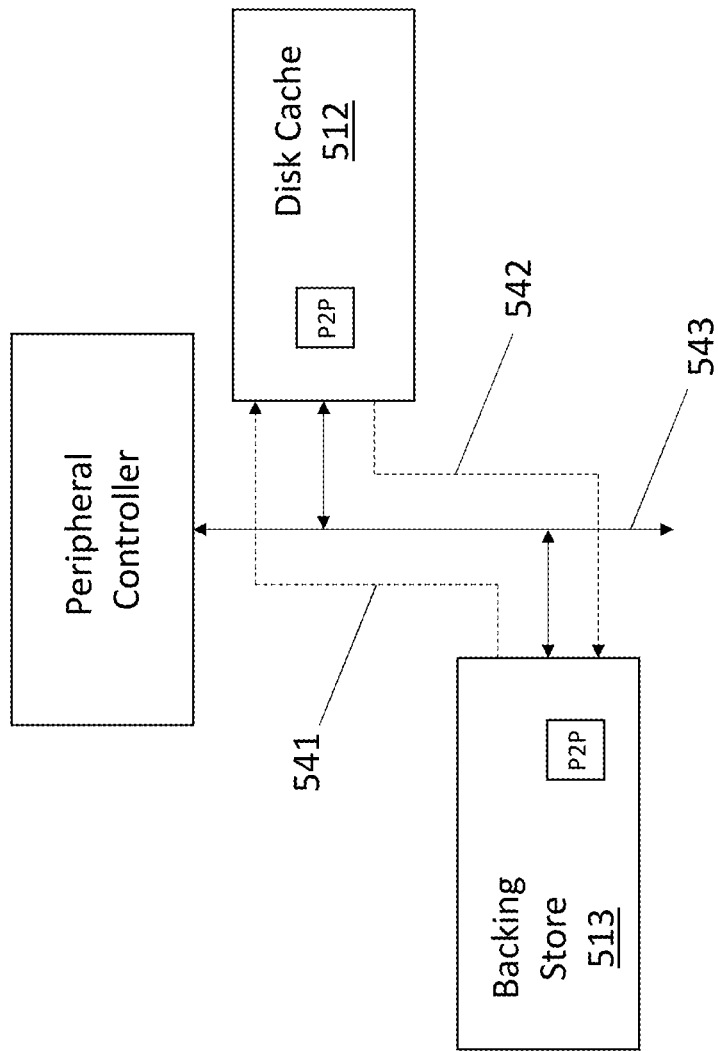
FIG. 5 shows a P2P data movement between a disk cache storage device and a backing storage device.

FIG. 5 also depicts other possible P2P data transfers 541, 542 in which the data being passed between the disk cache storage device 512 and the backing storage device 513 does not physically flow through a peripheral controller. For example, if the backing storage device 513 and disk cache storage device 512 are connected to a same memory channel (e.g., both storage devices 513, 512 are dual in-line memory modules (DIMMs) or other memory module coupled to a same Joint Electron Device Engineering Council (JEDEC) dual data rate (DDR) memory channel), or same Peripheral Component Interconnect Express (PCIe) bus or channel (which may additionally support NVM express (NVMe), e.g., to enable communication of any of Ethernet, Infiniband or Fibre channel protocols over the NVMe/PCIe solution), as just some examples, transfers 541 (which may correspond, e.g., to transfers ⅓ of FIG. 3a, ½ of FIG. 3b, and/or 2 of FIG. 3c) and/or transfers 542 (which may correspond, e.g., to transfers ½ of FIG. 3d) may transpire directly over the channel/bus 543 without the data being transferred having been received and transmitted by a peripheral controller. As depicted in FIG. 5 each of the storage devices 512, 513 include P2P intelligence hardware and/or firmware.

P2P intelligence hardware may be implemented as any combination of dedicated/hardwired logic circuitry, programmable logic circuitry (e.g., field programmable logic circuitry) or logic circuitry designed to execute some form of program code such as firmware (e.g., an embedded processor or embedded microcontroller, hereinafter, "embedded processor").

Figure 6:
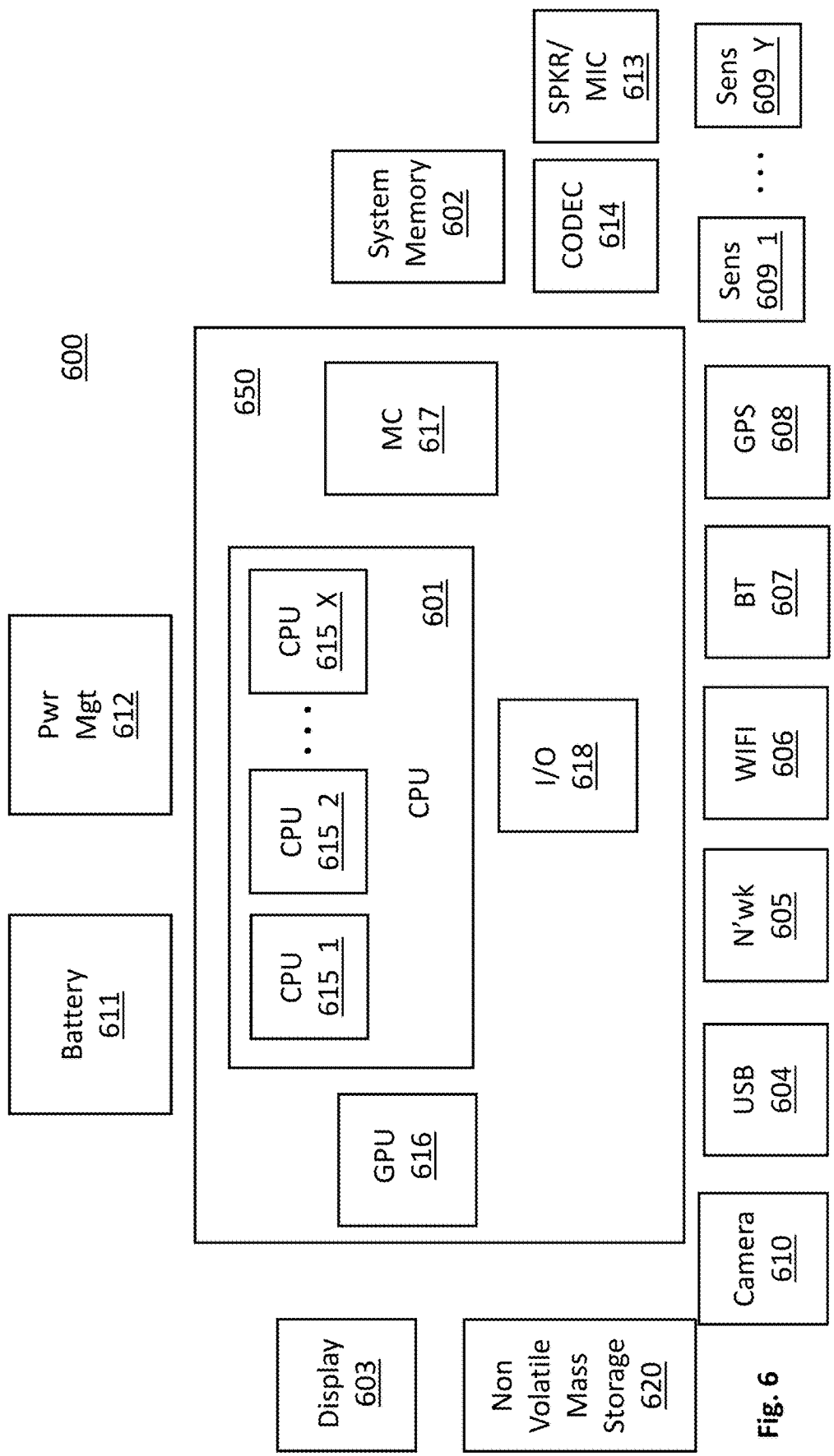
FIG. 6 shows a computing system.

FIG. 6 provides an exemplary depiction of a computing system 600 (e.g., a smartphone, a tablet computer, a laptop computer, a desktop computer, a server computer, etc.). As observed in FIG. 6, the basic computing system 600 may include a central processing unit 601 (which may include, e.g., a plurality of general purpose processing cores 615_1 through 615_X) and a main memory controller 617 disposed on a multi-core processor or applications processor, system memory 602, a display 603 (e.g., touchscreen, flat-panel), a local wired point-to-point link (e.g., USB) interface 604, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_Y, one or more cameras 610, a battery 611, a power management control unit 612, a speaker and microphone 613 and an audio coder/decoder 614. The CPU 601 or other processor (e.g., GPU) or other high-performance semiconductor chip may include a heat sink assembly having a pre-loaded bolt as described herein and/or a carrier with anti-tile posts as described herein.

An applications processor or multi-core processor 650 can be an SOC that includes one or more general purpose processing cores 615 within its CPU 601, one or more graphical processing units 616, a memory management function 617 (e.g., a memory controller) and an I/O control function or peripheral controller 618. The general-purpose processing cores 615 typically execute the operating system and application software of the computing system. The graphics processing unit 616 typically executes graphics intensive functions to, e.g., generate graphics information that is presented on the display 603. The memory control function 617 interfaces with the system memory 602 to write/read data to/from system memory 602.

Each of the touchscreen display 603, the communication interfaces 604-607, the GPS interface 608, the sensors 609, the camera(s) 610, and the speaker/microphone codec 613, 614 all can be viewed as various forms of I/O (input and/or output) relative to the overall computing system including, where appropriate, an integrated peripheral device as well (e.g., the one or more cameras 610). Depending on implementation, various ones of these I/O components may be integrated on the applications processor/multi-core processor 650 or may be located off the die or outside the package of the applications processor/multi-core processor 650.

The computing system also includes non-volatile storage 620 which may be the mass storage component of the system. The peripheral controller 618 may be coupled to certain mass storage devices of non-volatile mass storage 620 that are configured to behave as a disk cache or a backing store, where, the mass storage devices include P2P intelligence for directly sending data between one another as described at length above. P2P intelligence can also, separately or in combination, reside in the peripheral controller 618 and/or system software and/or firmware. The communicate link between the peripheral controller 618 and such mass storage devices may be PCIe, NVMe among other possible interconnect technologies.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., FPGA, PLD) for performing the processes, or by any combination of programmed computer components and custom hardware components. For example, a machine-readable storage medium may be used to store drawings of components described herein, and/or, of automated socket assembly/manufacturing processes described herein.

Therefore, elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
peer-to-peer intelligence to be integrated into a mass storage system comprising a cache and a backing store, wherein the cache is to interface to a host through a first interface and the backing store is to interface to the host through a second interface, the peer-to-peer intelligence to move data between the cache and the backing store without the data passing through main memory of a host computing system, wherein the move of the data between the backing store and the cache comprises moving a neighboring sector of a sector in main memory that has been updated from the backing store to the cache.

2. The apparatus of claim 1 wherein the peer-to-peer intelligence at least partially resides in cache controller software that controls the cache.

3. The apparatus of claim 1 wherein the peer-to-peer intelligence at least partially resides in a peripheral controller.

4. The apparatus of claim 1 wherein the peer-to-peer intelligence at least partially resides in a mass storage device used to implement the cache.

5. The apparatus of claim 1 wherein the cache presents a storage interface to a host computing system that handles access requests from the host computing system that are serviced from the backing store.

6. The apparatus of claim 1 wherein another move of the data between the backing store and cache comprises insertion of a data from the backing store into the cache.

7. The apparatus of claim 6 wherein the another move of the data is performed commensurate with a second instance of the data being called up from the backing store and written to the main memory.

8. The apparatus of claim 6 wherein the another move of the data is performed as a pre-fetch of the data into the cache.

9. The apparatus of claim 1 wherein another move of the data between the cache and the backing store is an eviction of the data from the cache to the backing store.

10. A computing system, comprising:
a plurality of processing cores;
a main memory;
a main memory controller between the processing cores and the main memory;
one or more peripheral controllers; and,
a mass storage system comprising a cache and a backing store, the mass storage system comprising peer-to-peer intelligence, wherein the cache interfaces to the one or more peripheral controllers through a first interface and the backing store interfaces to the one or more peripheral controllers through a second interface, the peer-to-peer intelligence to move data between the cache and the backing store without the data passing through the main memory, wherein the move of the data between the backing store and the cache comprises moving a neighboring sector of a sector in main memory that has been updated from the backing store to the cache.

11. The computing system of claim 10 wherein the peer-to-peer intelligence at least partially resides in any of:
cache controller software that controls the cache;
a peripheral controller;
a mass storage device used to implement the cache; and
a mass storage device used to implement the backing store.

12. The computing system of claim 10 wherein another move of the data between the backing store and cache comprises insertion of a data item from the backing store into the cache.

13. The computing system of claim 12 wherein the another move of the data is performed commensurate with a second instance of the data being called up from the backing store and written to the main memory.

14. The computing system of claim 12 wherein the another move of the data is performed as a pre-fetch of data into the cache.

15. The computing system of claim 10 wherein another move of the data between the cache and the backing store is an eviction of the data from the cache to the backing store.

16. A machine readable storage medium, and not transitory electromagnetic signal energy, having store thereon program code that when processed by a processor of a computer causes the processor to perform a method, wherein the computer comprises one or more peripheral controllers, the method comprising:
moving data between a backing store of a storage system and a cache of the storage system without the data moving through a main memory of the computer wherein the cache is to interface to the one or more peripheral controllers through a first interface and the backing store is to interface to the one or peripheral controllers through a second interface, wherein the move of the data between the backing store and the cache comprises moving a neighboring sector of a sector that has been updated in main memory from the backing store to the cache.

17. The machine readable storage medium of claim 16 wherein another move of the data between the backing store and the cache comprises insertion of a data item from the backing store into the cache.

18. The machine readable storage medium of claim 17 wherein the another move of the data is performed commensurate with a second instance of the data being called up from the backing store and written to the main memory.

19. The machine readable storage medium of claim 17 wherein the another move of the data is performed as a pre-fetch of data into the cache.

20. The machine readable storage medium of claim 16 wherein another move of the data between the cache and the backing store is an eviction of the data from the cache to the backing store.

* * * * *